(12) United States Patent
Taylor

(10) Patent No.: US 6,453,421 B1
(45) Date of Patent: Sep. 17, 2002

(54) PROCESSOR SYSTEM WITH POWER SUPPLY SELECTION MECHANISM

(75) Inventor: Gregory F. Taylor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/316,683

(22) Filed: May 21, 1999

(51) Int. Cl.[7] ............................. G06F 1/00; H02H 7/00; H02H 7/06
(52) U.S. Cl. ......................... 713/300; 361/18; 361/21; 361/52
(58) Field of Search ................................. 713/300, 340; 361/18, 21, 52; 326/80, 82, 86, 87, 114, 85; 323/291, 281, 299, 313, 304, 288

(56) References Cited

U.S. PATENT DOCUMENTS

| | | | | |
|---|---|---|---|---|
| 5,627,413 A | * | 5/1997 | Mughir et al. | 307/86 |
| 5,757,171 A | * | 5/1998 | Babcock | 323/271 |
| 5,939,868 A | * | 8/1999 | Hall et al. | 323/281 |
| 6,035,407 A | * | 3/2000 | Gebara et al. | 713/300 |
| 6,212,050 B1 | * | 4/2001 | Haider | 361/86 |

* cited by examiner

Primary Examiner—Peter Wong
Assistant Examiner—Tim Vo
(74) Attorney, Agent, or Firm—Schwegman, Lundberg, Woessner & Kluth, P.A.

(57) ABSTRACT

A microprocessor motherboard and system include a microprocessor having external input and external output connections. The microprocessor includes a conductive path formed between one of the external input connections and an external output connection for routing a supply voltage to the external output connection. The microprocessor, therefore, selects an appropriate bus voltage for communicating with peripheral circuitry. New generations of microprocessors can be implemented without changing the remaining motherboard configuration.

22 Claims, 3 Drawing Sheets

US 6,453,421 B1

PROCESSOR SYSTEM WITH POWER SUPPLY SELECTION MECHANISM

FIELD OF THE INVENTION

This invention relates generally to power supply selection, and more particularly to a processor system with power supply selection.

BACKGROUND

Introducing a new microprocessor to the market is easier if it operates in the systems built for a previous generation of microprocessors. Because of this, designers try to build their systems so that future, lower voltage microprocessors can be plugged in with a minimum of, and preferably no, redesign. That is, designers desire to have components which can support more than one generation of microprocessor voltage. A new generation microprocessor which uses a lower voltage may require a change in system components, unless efforts are taken to make the new processor compatible with existing components.

Implementing a new microprocessor which requires a different voltage supply for use in the system is currently dealt with in one of two manners. First, systems can be designed which are compatible with only a single generation of microprocessor. This eliminates any cross generation power supply concerns, but complicates the transition from one microprocessor to another. The second solution is to add a voltage regulator that can be switched between two different output voltages. This solution permits flexible motherboard the designs, but requires a more expensive voltage regulator module in the system.

In some systems, open drain signals may be used to alter the voltage between a processor and an interface chip. An open drain drive allows an interface chip to receive a high voltage that it needs to function without requiring the microprocessor to pull up to that high voltage. An open drain termination voltage may become too high for even an open drain output on the microprocessor to withstand. However, with recent processors the maximum voltage that can be tolerated using pull-up resisters for the open drain signals is below the minimum voltage at which the prior generation can operate.

For the reasons stated above, and for other reasons stated below which will become apparent to those skilled in the art upon reading and understanding the present specification, there is a need in the art for a microprocessor system which allows the use of new processors while maintaining system voltage compatibility.

SUMMARY

One embodiment of the present invention provides a processing system comprising a plurality of voltage regulation modules each having an output connection to supply an output voltage, and a microprocessor having a package, a plurality of external input connections and at least one external output connection. Each of the external input connections is connected to one of the output connections of the plurality of voltage regulation modules. An electrically conductive path is provided within the microprocessor package. The electrical connection is coupled to one of the plurality of external input connections and to at least one external output connection to selectively couple one of the output voltage supplies to a bus.

In another embodiment, a processing system motherboard comprises first and second voltage regulation modules each having an output connection to supply an output voltage, where the first voltage regulation module provides a voltage VCC 1, and the second voltage regulation module provides the voltage VCC 2. A microprocessor is provided which has a package, first and second external input connections and an external output connection. The first external input connection is connected to the output connection of the first voltage regulation module, and the second external input connection is connected to the output connection of the second voltage regulation module. An electrically conductive path is provided within the microprocessor package. The electrical connection is coupled to either the first or second external input connection and the external output connection to selectively couple either VCC 1 or VCC 2 to the external output connection. An open drain bus is coupled to the external output connection of the microprocessor, and peripheral circuitry coupled to the open drain bus.

DETAILED DESCRIPTION

Microprocessors are continually being built on new manufacturing technologies with ever-smaller operating voltages. Introducing a new microprocessor to the market is easier if it operates in a system built for the previous generation of microprocessors. Open drain interfaces between the microprocessor and support circuits are often used in microprocessor systems for two reasons. First, if a support circuit needs to receive a high voltage in order to function, an open drain drive does not require the microprocessor to pull up the voltage to this high voltage level. Second, the termination impedance provided in the open drain connection can serve to reduce voltage, or signal, ringing. Open drain connections, however, can still provide a problem if a new generation of microprocessor operates using a very low voltage supply. That is, the open drain termination voltage may be too high for an open drain connection. The present invention provides a system and method which allow a new generation of microprocessor to be implemented using a common motherboard, or supply voltage configuration.

In the following detailed description of embodiments of the present invention, reference is made to the accompanying drawings which form a part hereof, and in which are shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the claims.

Figure 1:
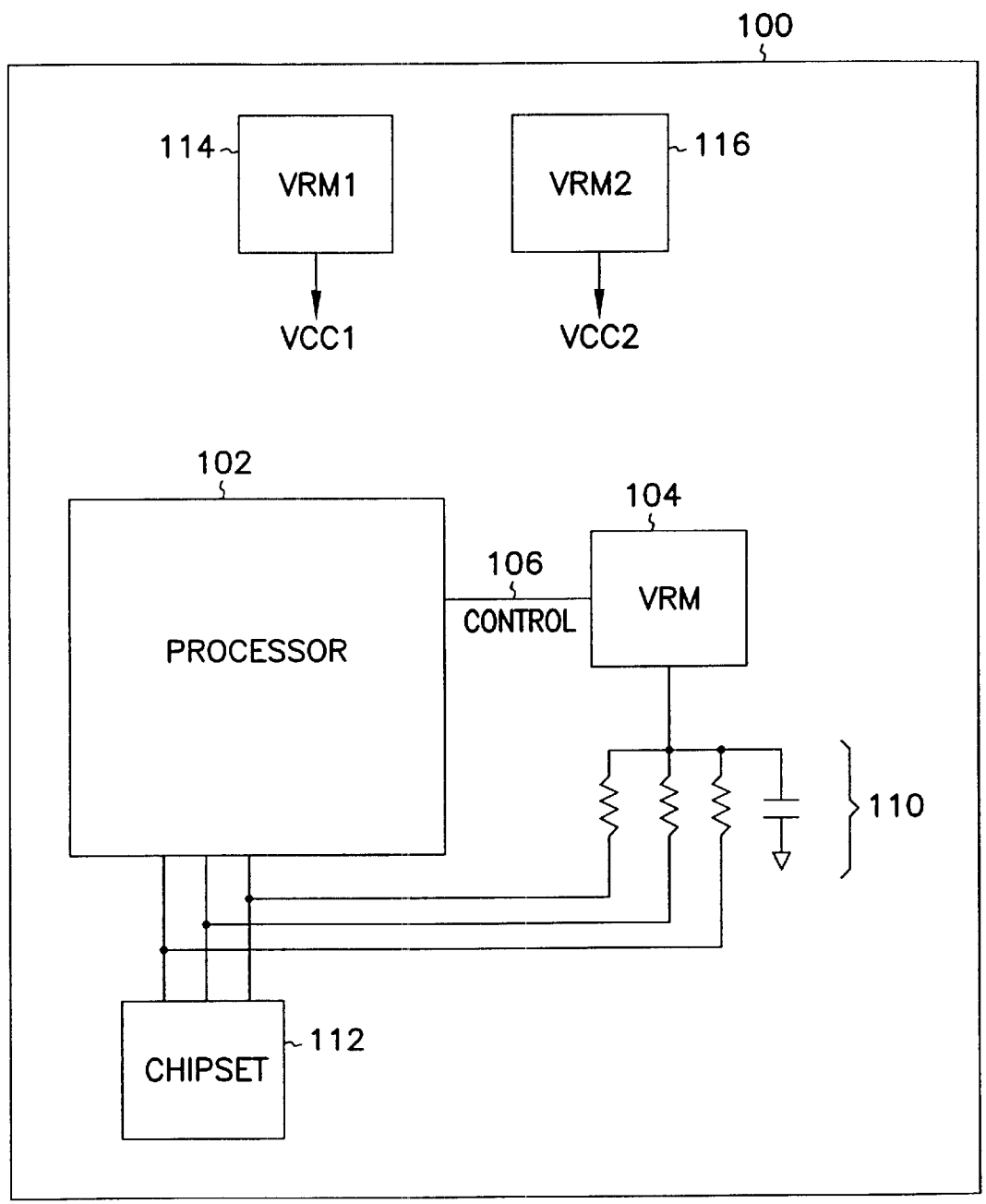
FIG. 1 is a prior art processing system having three voltage regulation modules.

Prior to describing the present invention, a motherboard 100 is described with reference to FIG. 1 which includes a variable supply circuit. The system includes a microprocessor 102 and a programmable voltage regulator module (VRM) 104 coupled to the microprocessor via an external selection connection 106. The voltage regulator module is coupled to an open drain interface 110 of a chip set 112 of the system. The chip set can be any type of support circuitry for the microprocessor, or can be a second microprocessor circuit. The system also includes first 114 and second 116 voltage regulator modules. These voltage regulator modules are provided in the system and can be used by the microprocessor and/or support circuitry provided in the system. In operation, an output signal provided by the microprocessor selects a voltage output for the programmable voltage regulator module. An older generation microprocessor will typically request a higher, backward compatible voltage, while a newer microprocessor may request a lower, more easily tolerated voltage. It should be noted that the chip set must be compatible with either supply voltage level. In addition, the programmable voltage regulation module is needed even if there are separate voltage regulation modules in the system that generate both the old and the new voltage levels.

Figure 2:
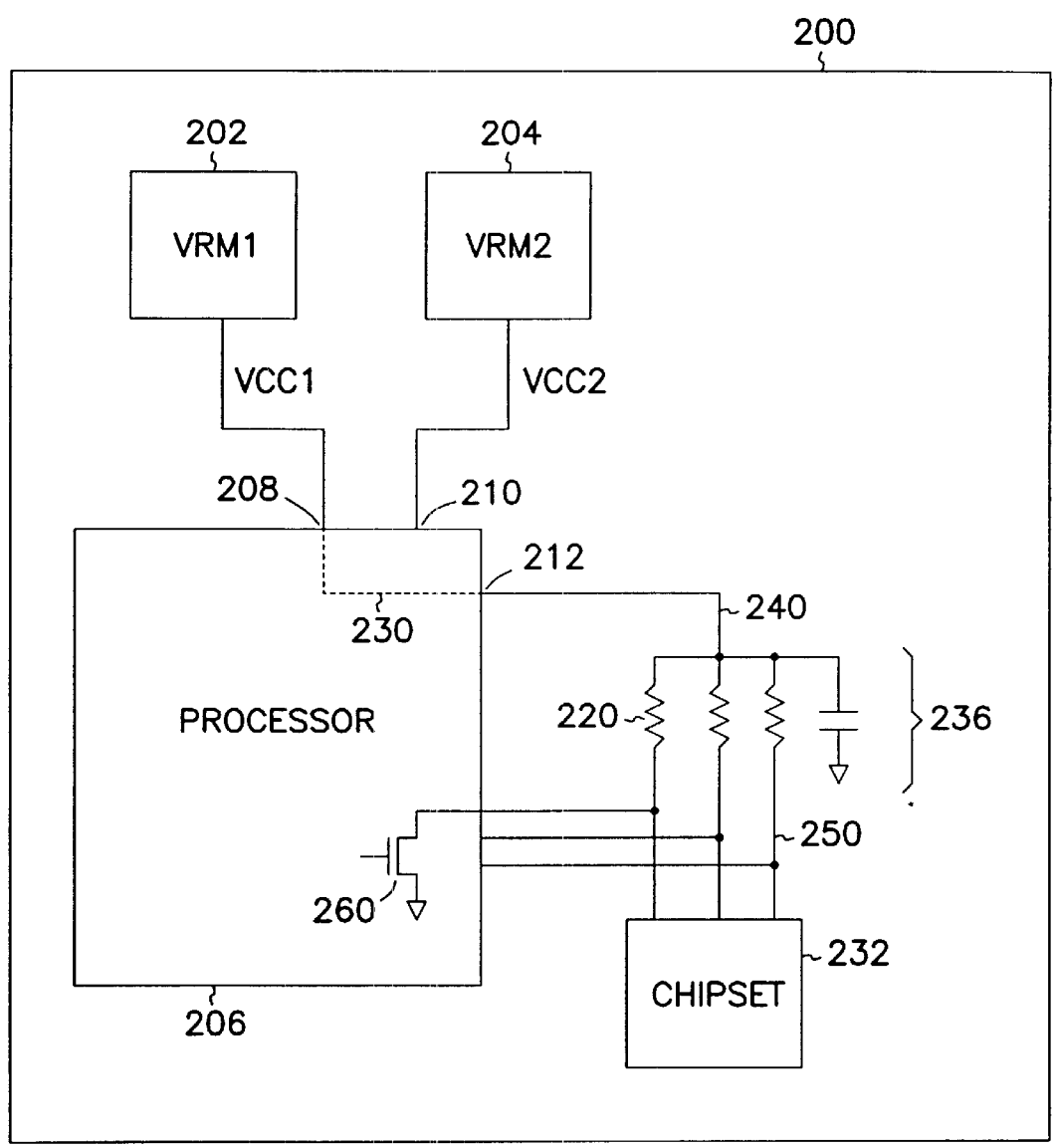
FIG. 2 is a system processing system according to one embodiment of the present invention.

Referring to FIG. 2, a diagram of a system 200 according to an embodiment of the present invention is provided. The system can be a computer motherboard, printed circuit board, a processing system such as a computer, or the like. FIG. 2 shows one embodiment of the present invention which includes a first voltage regulator module 202 which supplies a first voltage (VCC 1) and a second voltage regulator module 204 which supplies a second voltage (VCC 2). Each of these voltage supplies is provided to supply voltages to peripheral circuitry in the system. For example, a system clock may need a voltage of 2.5 V and a high speed bus may need a voltage of 1.5 V. In addition, other peripheral devices may require other voltages.

The system also includes a microprocessor 206. It will be appreciated by those skilled in the art, that the microprocessor can be coupled to a motherboard via a socket. As such, the microprocessor can be easily replaced. The microprocessor includes first 208 and second 210 external connections which are coupled to both of the voltage regulator modules. These connections can be external pins, or other types of electrical connections which couple the microprocessor to the motherboard. The microprocessor also includes a third external connection 212 which is coupled to termination resistors 220, or other devices which need to receive a preselected voltage supply from either VCC 1 or VCC 2. That is, in comparison to the system of FIG. 1 a variable voltage regulator module 104 is not provided to supply a preselected voltage to peripheral circuitry. The system of the present invention, however, provides a selected voltage to the peripheral circuitry by controlling the voltage path from the voltage supply sources to the peripheral circuitry.

In one embodiment, one of the external input connections is electrically connected to the external output connection using a conductive path 230 provided inside of the microprocessor package. For example, a microprocessor having external electrical pins can have a conductive tab, or wire, which is selectively coupled to one of the external input connections 208 and the external output connection 212. The term "wire" is used herein to encompass any conductive path, including but not limited to, a wire, a lead frame, or other metallic conductor. This physical connection is provided prior to completing the packaging of the microprocessor. That is, the microprocessor package includes an integrated circuit die, an external wiring network such as a lead frame, and an environmentally protective package such as over-molded plastic. The electrical path between the external connections, therefore, is provided prior to encapsulating the integrated circuit for environmental protection. In another embodiment, circuitry can be provided in the microprocessor to selectively couple one of the external input connections to the external output connection. This circuitry allows dynamic selection of a VCC voltage level and can include selectively activated transistors, logic circuitry, or the like.

In one embodiment of the present invention, a microprocessor from an earlier generation may be provided on the motherboard and electrically couple the first voltage regulator module (VCC 1) to the external output connection. In another embodiment, a newer generation microprocessor may be provided on the motherboard and electrically couple the voltage supply provided by voltage regulator module (VCC 2) to the external output connection. Using the present invention, therefore, an appropriate voltage can be provided to the peripheral circuitry without the addition of a controllable voltage regulation module, and the additional cost to the system.

As illustrated, an open drain bus 236 may be provided in the system and connected to the external output connection. An open drain bus allows devices of differing voltages to communicate with each other by driving the voltages on the bus up or down. Thus, the open drain bus can be connected to system devices that operate at a voltage level different from the microprocessor. For example, a chipset 232 may be connected to the open drain bus to allow the chipset to communicate with the microprocessor. It will be appreciated that the device(s) coupled to the open drain bus is not limited to a chip set, but can be any peripheral circuitry or coprocessor.

The bus includes a pull-up voltage connection 240, current limiting resistors 220, and a conductor 250 coupled to the processor and the chipset. The bus is operated by selectively activating a pull-down transistor 260 located in the microprocessor. The transistor selectively couples a voltage provided on the bus to ground. It will be appreciated that new generations of low voltage processors include transistors which cannot withstand high drain-source voltages. That is, the reliability of the transistor insulation, such as oxide, is questionable at large bus voltages. While the transistors are described as located in the processor, the bus can be coupled to allow the peripheral devices to control the bus signals. In this embodiment, the bus control transistors are provided in the peripheral device. Using the processor package to route the voltage supplies can create inductive problems as a result of the narrow conductors used, and the numerous physical connections encountered. At least one capacitor, therefore, is coupled to the external connection of the processor to stabilize the voltage provided on the external output connection and reduce the impact of the increased impedance. The open drain bus has been simplified for purposes of the description, and it will be appreciated after reading the present disclosure that other electrical paths can be rovided between the external connection and peripheral circuits.

Figure 3:
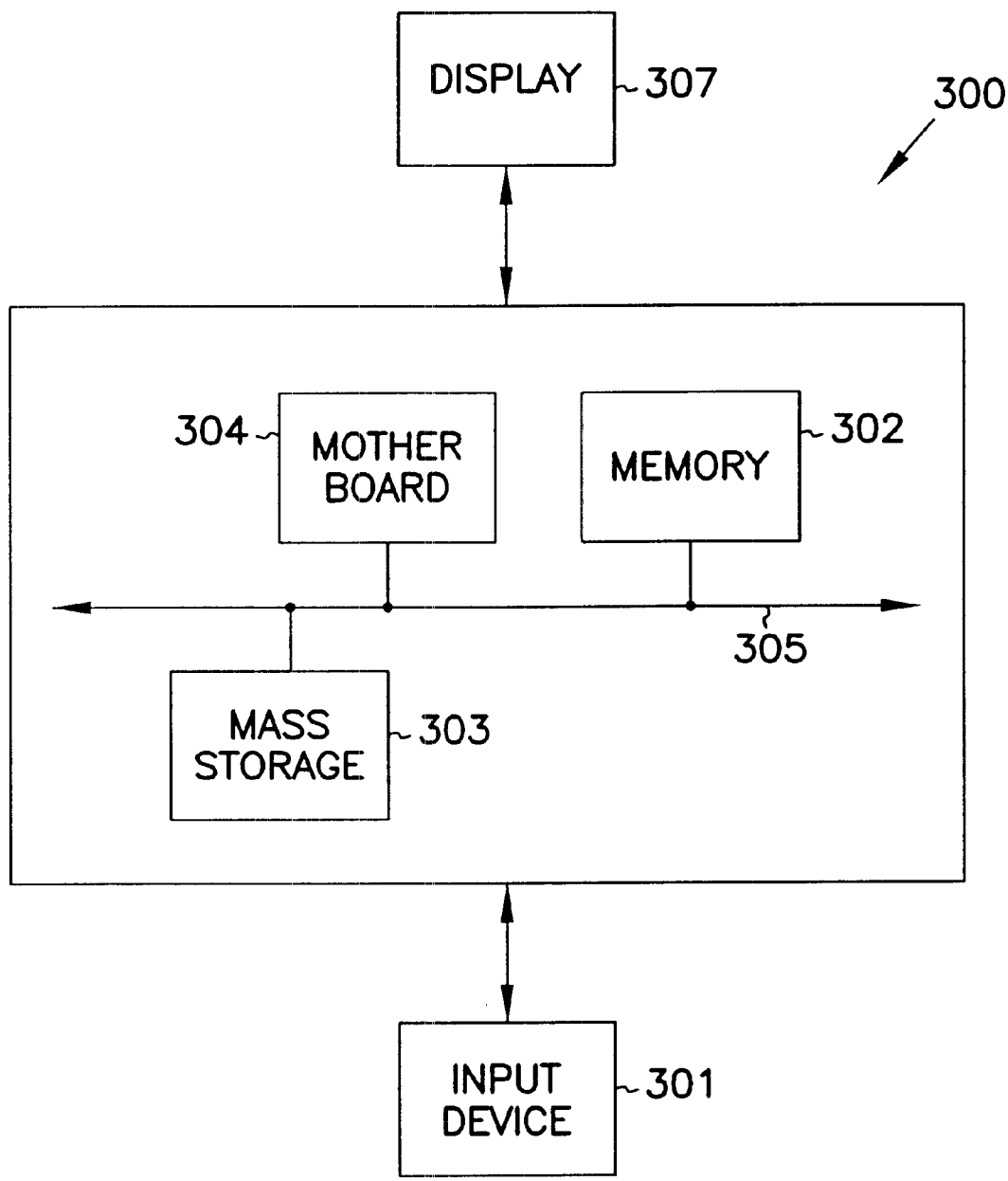
FIG. 3 is a block diagram of a computer system according to one embodiment of the present invention.

FIG. 3 is a block diagram of a computer system 300 incorporating a motherboard described herein. The computer system 300 can comprise a bus 305, an input or keyboard interface 301, memory 302, mass storage device 303, processor motherboard 304, and a display 307. Bus 305 can be a single bus or a combination of multiple buses. Bus 305 provides communication links between components in the computer system. Input interface 301 can be a dedicated device or can reside in another device such as a bus controller or other controller. Input interface 301 allows coupling of a keyboard to the computer system and transmits signals from a keyboard to the computer system. Memory 302 can comprise a dynamic random access memory (DRAM) device, a static random access memory (SRAM)

device, or other memory devices. Memory 302 stores information from mass storage device 303 and processor 304 for use by processor 304. Mass storage device 303 can be a hard disk drive, a floppy disk drive, a CD-ROM device, or a flash memory device. Mass storage device 303 provides information to external memory 302.

The various embodiments described above permit microprocessors which have different voltage requirements to be used with the same system. This allows the use of the best technology available for microprocessors and provides significant cost savings by allowing lower cost microprocessors to be added to existing systems.

A microprocessor motherboard has been described which includes a microprocessor having external input and external output connections. The microprocessor includes a conductive path formed between one of the external input connections and an external output connection for routing a supply voltage to the external output connection. The microprocessor, therefore, selects an appropriate bus voltage for communicating with peripheral circuitry. New generations of microprocessors can be implemented without changing the remaining motherboard configuration.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefor, it is manifestly intended that this invention be limited only by the following claims and equivalents thereof.

What is claimed is:

1. A processing system comprising:
   a plurality of voltage regulation modules each having an output connection to supply an output voltage;
   a microprocessor having a package, a plurality of external input connections and at least one external output connection, each of the external input connections are connected to one of the output connections of the plurality of voltage regulation modules; and
   an electrically conductive path provided within the microprocessor package, the electrical connection is coupled to one of the plurality of external input connections and to the at least one external output connection to selectively couple one of the output voltage supplies to a bus.

2. The processing system of claim 1 wherein the bus is an open drain bus circuit.

3. The processing system of claim 1 wherein the electrically conductive path comprises circuitry for dynamically coupling one of the plurality of external input connections to the at least one external output connection.

4. The processing system of claim 1 wherein the electrically conductive path comprises a wire for connecting one of the plurality of external input connections to the at least one external output connection.

5. The processing system of claim 1 wherein the bus transfers signals between the microprocessor and a peripheral circuit.

6. The processing system of claim 2 wherein the bus transfers signals between the microprocessor and a peripheral circuit.

7. The processing system of claim 5 wherein the peripheral circuit is a chipset.

8. The processing system of claim 5 wherein the peripheral circuit is a coprocessor.

9. The processing system of claim 6 wherein the peripheral circuit is a chipset.

10. The processing system of claim 6 wherein the peripheral circuit is a coprocessor.

11. A processing system comprising:
    a plurality of voltage regulation modules each having an output connection to supply an output voltage;
    a microprocessor having a package, a plurality of external input connections and at least one external output connection, each of the external input connections are connected to one of the output connections of the plurality of voltage regulation modules; and
    an electrically conductive path provided within the microprocessor package, the electrical connection is coupled to one of the plurality of external input connections and to the at least one external output connection to selectively couple one of the output voltage supplies to an open drain bus comprising
    a current limiting resistor coupled between the at least one external output connection and a peripheral circuit;
    a capacitor coupled to the at least one external output connection; and
    a pull-down transistor located in the microprocessor and coupled to the bus to selectively couple a voltage provided by the bus to ground.

12. The processing system of claim 11 wherein the bus transfers signals between the microprocessor and a peripheral circuit.

13. The processing system of claim 12 wherein the peripheral circuit is a chipset.

14. The processing system of claim 12 wherein the peripheral circuit is a coprocessor.

15. A processing system motherboard comprising:
    first and second voltage regulation modules each having an output connection to supply an output voltage, where the first voltage regulation modules provides a voltage VCC 1, and the second voltage regulation modules provides a the voltage VCC 2;
    a microprocessor having a package, first and second external input connections and an external output connection, the first external input connection is connected to the output connection of the first voltage regulation module, the second external input connection is connected to the output connection of the second voltage regulation module;
    an electrically conductive path provided within the microprocessor package, the electrical connection is coupled to either the first or second external input connection and the external output connection to selectively couple either VCC 1 or VCC 2 to the external output connection;
    an open drain bus coupled to the external output connection of the microprocessor; and
    peripheral circuitry coupled to the open drain bus.

16. The processing system motherboard of claim 15 wherein the electrically conductive path is a metallic conductor formed between either the first or second external input connection and the external output connection.

17. The processing system motherboard of claim 15 wherein the peripheral circuitry is achip set.

18. The processing system motherboard of claim 15 wherein the peripheral circuitry is a coprocessor.

19. A processing system motherboard comprising:
    first and second voltage regulation modules each having an output connection to supply an output voltage, where the first voltage regulation modules provides a voltage VCC 1, and the second voltage regulation modules provides a the voltage VCC 2;

a microprocessor having a package, first and second external input connections and an external output connection, the first external input connection is connected to the output connection of the first voltage regulation module, the second external input connection is connected to the output connection of the second voltage regulation module;

an electrically conductive path provided within the microprocessor package, the electrical connection is coupled to either the first or second external input connection and the external output connection to selectively couple either VCC 1 or VCC 2 to the external output connection;

an open drain bus coupled to the external output connection of the microprocessor; and peripheral circuitry coupled to the open drain bus, the open drain bus comprising
- a current limiting resistor coupled between the external output connection and the peripheral circuit;
- a capacitor coupled to the external output connection; and
- a pull-down transistor located in the microprocessor and coupled to the peripheral circuit to selectively couple a voltage provided to the peripheral circuit to ground.

20. A microprocessor comprising:

an integrated circuit die;

external connections comprising first and second external input connections to respectively receive first and second voltage supplies, and an external output connection to provide power to a bus;

an electrically conductive path formed between one of the first and second external input connections and the external output connection; and an environmentally protective package encompassing the integrated circuit die and the electrically conductive path.

21. The microprocessor of claim 20 wherein the electrically conductive path is a metallic conductor formed between either the first or second external input connections and the external output connection.

22. A computer comprising:

a memory device;

an input device;

a display; and a central processing unit motherboard comprising:
  first and second voltage regulation modules each having an output connection to supply an output voltage, where the first voltage regulation modules provides a voltage VCC 1, and the second voltage regulation modules provides the voltage VCC 2;
  a microprocessor having a package, first and second external input connections and an external output connection, the first external input connection is connected to the output connection of the first voltage regulation module, the second external input connection is connected to the output connection of the second voltage regulation module;
  an electrically conductive path provided within the microprocessor package, the electrical connection is coupled to either the first or second external input connection and the external output connection to selectively couple either VCC 1 or VCC 2 to the external output connection;
  an open drain bus coupled to the external output connection of the microprocessor; and
  peripheral circuitry coupled to the open drain bus.

* * * * *

UNITED STATES PATENT AND TRADEMARK OFFICE
CERTIFICATE OF CORRECTION

PATENT NO. : 6,453,421 B1
DATED : September 17, 2002
INVENTOR(S) : Gregory F. Taylor It is certified that error appears in the above-identified patent and that said Letters Patent is hereby corrected as shown below:

Column 4,
Line 52, delete "rovided" and insert -- provided --, therefor.

Column 6,
Line 39, delete "a" before "the".
Line 62, delete "achip" and insert -- a chip --, therefor.

Column 7,
Line 3, delete "a" before "the".

Signed and Sealed this

Thirty-first Day of December, 2002

JAMES E. ROGAN
*Director of the United States Patent and Trademark Office*